A. C. MICHAEL.
WATERING TROUGH.
APPLICATION FILED APR. 15, 1910.
Reissued May 9, 1911. 13,237.
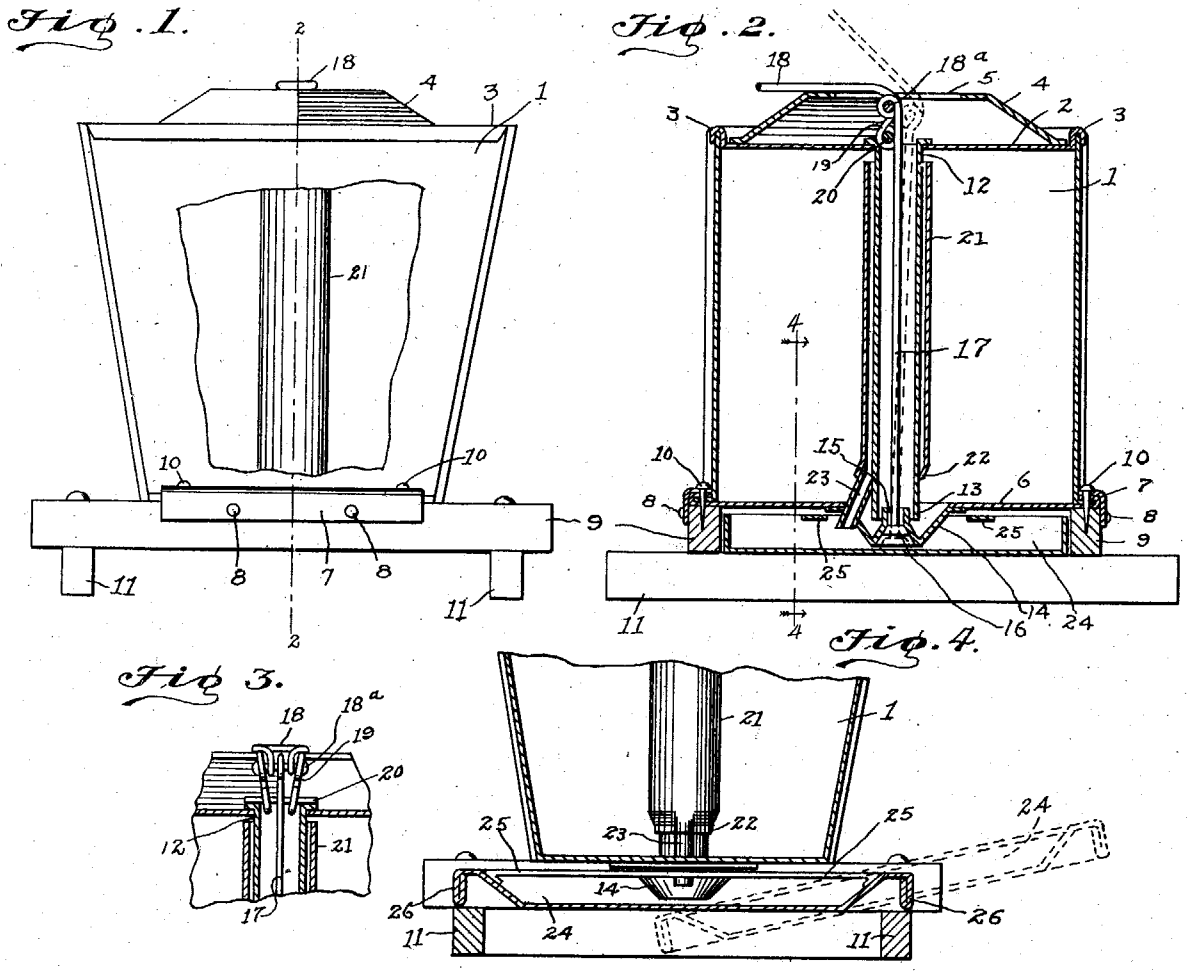
Witnesses
Wm. L. Bushong.
L. B. Woerner
Inventor
Aureal C. Michael,
By Minturn & Woerner,
Attorneys.
THE NORRIS PETERS CO., WASHINGTON, D. C.

UNITED STATES PATENT OFFICE.

ANCEAL C. MICHAEL, OF GOSHEN, INDIANA, ASSIGNOR, BY MESNE ASSIGNMENTS, TO CHARLES E. LACEY, OF MONTGOMERY COUNTY, INDIANA, H. U. McCURDY, OF RENO, KANSAS, AND WALTER H. O'NEALL, OF CRAWFORDSVILLE, INDIANA.

WATERING-TROUGH.

13,237. Specification of Reissued Letters Patent. Reissued May 9, 1911.

Original No. 885,632, dated April 21, 1908, Serial No. 394,535. Application for reissue filed April 15, 1910. Serial No. 555,760.

*To all whom it may concern:*

Be it known that I, ANCEAL C. MICHAEL, a citizen of the United States, residing at Goshen, in the county of Elkhart and State of Indiana, have invented certain new and useful Improvements in Watering-Troughs, of which the following is a specification.

This invention relates to watering troughs designed for the purpose of supplying fresh water to poultry and small stock, and one of the principal objects of the same is to provide a drinking fountain of that type which automatically discharges water from a tank to a trough and maintains a constant supply of water in the trough, in which provision will be made for conveniently refilling the water tank, and for providing means for replacing the water fed from the tank by air to support the flow.

Another object of my invention is to provide a water tank of such contour as will shade the water trough.

Still another object of my invention is to simplify and to render more efficient in use, drinking fountains of the character referred to.

These and other objects may be attained by means of the construction illustrated in the accompanying drawings, in which—

Figure 1 is a side elevation of a watering trough made in accordance with my invention, a portion of the side being broken away to illustrate the interior thereof. Fig. 2 is a central vertical section on the line 2—2 of Fig. 1. Fig. 3 is a detail section taken through the upper portion of the tank. Fig. 4 is a vertical section on the line 4—4 of Fig. 2 looking in the direction indicated by the arrows.

Referring to the drawings for a more specific description of my invention the numeral 1 designates a water tank, the opposite sides of which converge toward the bottom as shown in Fig. 1 in order to shade the water trough. The top 2 of the tank is provided with flanges 3 bent down over the upper edge of the tank 1 and secured on the upper surface of the top 2 is a housing 4 provided with a central opening 5. The bottom 6 of the tank has its outer edge bent around the outwardly turned flange of the tank body and to secure said bottom to the tank an angle plate 7 is provided, said angle plate being connected by fastenings 8 to the supporting bars 9. The inwardly extending flanges of the angle plate are secured to the bars 9 by means of the fastenings 10, said fastenings passing through the outwardly turned flanges on the body 1 and the outer edges of the bottom 6 as shown more clearly in Fig. 2.

The bars 9 are supported upon cross bars 11. Connected centrally to the top 2 is a depending tube 12, the lower end 13 of which is open and is disposed within a cup 14 secured to the bottom 6 and depending therefrom. The cup 14 has an upwardly extending nozzle 15. A stopper 16 connected to the lower end of the rod 17 closes the nozzle 15. Connected to the upper end of the rod 17 is a lever 18, said lever having a member 19 pivotally connected to a bar 18[a] and pivoted to a cross bar 20 supported upon the top 2 of the tank. By swinging the lever into the position shown in the dotted lines in Fig. 2 the stopper 16 moves outward from the nozzle 15.

A tube 21 surrounds the tube 12, the upper end of said tube 21 terminating at a slight distance below the top 2 of the tank. The lower end of the tube 21 is bent inwardly at 22 and secured to the tube 12. An outlet tube 23 is secured between the tubes 12 and 21, said tube extending through the cup 14 to admit air to the tank 1. The trough 24 is provided with cross slats 25 and the outer edges of the trough are bent downward and doubled as at 26, said flanges 26 resting on the cross bars 11. As shown in Fig. 4 in dotted lines the trough 24 is removable so that it can be readily cleaned.

The operation of my invention may be briefly described as follows: When it is desired to fill the tank 1, the stopper 16 is drawn upward by the lever 18, the water then being poured into the opening 5 will pass down the tube 12 into the cup 14, and thence upward in the tank to the required height. When the stopper 16 is moved downward in the nozzle 15 the water will overflow the top of said nozzle and discharge into the trough 24. When the water in the trough 24 rises to a point above the lower end of the tube 23, air to support the flow of water will be shut off and hence the water in trough 24 will only reach a point just above the lower end of said tube 23. When the water is used from the trough 24 air entering the tube 23 will pass up to the upper end of the tank and thus permit water to flow over the top of the nozzle 15 into said trough.

From the foregoing it may be obvious that a device made in accordance with my invention will feed water automatically from the tank to the trough and that the trough may be readily removed whenever it is required to clean the same.

Having thus fully described my said invention, what I desire to secure by Letters Patent, is—

1. A drinking fountain, comprising a water tank, a filling tube extending downward from the top of the tank and having its discharge end below the bottom of the tank, said tube being provided with an opening communicating with the tank, a valve mounted adjacent to and in line with for closing the discharge end of the filling tube, a tube for conveying air having an air opening above the water in the tank and a second opening below the bottom of the tank, and a trough arranged under the bottom of the tank and beneath the lower ends of the filling and air conveying tubes.

2. A drinking fountain, comprising a water tank, a filling tube extending downward from the top of the tank and having its discharge end below the bottom of the tank, said tube being provided with an opening communicating with the tank, a valve mounted adjacent to and in line with for closing the discharge end of the filling tube, means for operating said valve, a tube for conveying air having an air opening above the water in the tank and a second opening below the bottom of the tank, and a trough arranged below the bottom of the tank and beneath the lower ends of the filling and air conveying tubes.

3. A drinking fountain, comprising a water tank, a filling tube extending downward from the top of the tank and having its discharge end below the bottom of the tank, said tube being provided with an opening communicating with the tank, a valve seat arranged below and in line with the discharge end of the filling tube, a valve to fit said valve seat, means for operating said valve, a tube for conveying air having an air opening above the water in the tank and a second opening below the bottom of the tank, and a trough arranged under the bottom of the tank and beneath the lower ends of the filling and air conveying tubes.

4. A drinking fountain, comprising a water tank, a filling tube extending downward from the top of the tank and having its discharge end below the bottom of the tank, said tube being provided with an opening communicating with the tank, a tube for conveying air having an air opening above the water in the tank and a second opening below the bottom of the tank, and means for controlling the flow of water through the discharge end of the filling tube.

5. A drinking fountain, comprising a water tank, a filling tube extending downward from the top of the tank and having its discharge end below the bottom of the tank, a tube for conveying air surrounding said downwardly extending tube and having an air opening above the water in the tank and a second opening below the bottom of the tank, said filling tube being provided with an opening communicating with the tank, a valve arranged below and in line with the discharge end of the filling tube, means for operating said valve, and a trough arranged under the bottom of the tank and beneath the lower ends of both the filling and air conveying tubes.

6. A drinking fountain, comprising a water tank, a filling tube extending from the top of said tank and having its discharge end below the bottom of the tank, said tube being provided with an opening communicating with the tank, a nozzle arranged below and in line with the discharge end of the filling tube, said nozzle being secured to the bottom of and communicating with said tank, a stopper to fit said nozzle, a rod connected to said stopper and extending through the filling tube, and an eccentric operating lever connected to the upper end of the rod.

7. A drinking fountain, comprising a water tank, a filling tube extending from the top of said tank and having its discharge end below the bottom of the tank, said tube being provided with an opening communicating with the tank, a nozzle arranged below and in line with the discharge end of the filling tube, said nozzle being secured to the bottom of and communicating with said tank, a stopper to fit said nozzle, a rod connected to said stopper and extending through said tube, means for imparting longitudinal travel to said rod and stopper, and a trough arranged under the bottom of the tank and beneath the lower end of the filling tube.

8. A drinking fountain, comprising a water tank, a filling tube extending downward from the top of the tank and having its discharge end below the bottom of the tank, said tube being provided with an opening communicating with the tank, a nozzle arranged below and in line with the discharge end of the filling tube, said nozzle being secured to the bottom of and communicating with said tank, a valve for closing said nozzle, a rod connected to said valve and extending through the filling tube, and means for imparting movement to both the rod and valve.

9. A drinking fountain, comprising a water tank, a filling tube extending downward from the top of the tank and having its discharge end below the bottom of the tank, said tube being provided with an opening communicating with the tank, a cup secured to the bottom of the tank and surrounding the discharge end of the filling tube, a valve arranged below and in line with the discharge end of the filling tube, means for operating said valve, a tube for conveying air having an air opening above the water in the tank and a second opening below the bottom of the tank, and a trough arranged under the bottom of the tank and beneath the lower ends of both the filling and air conveying tubes.

In witness whereof, I have hereunto set my hand at Goshen, Indiana, this 11th day of April, 1910, A. D., one thousand nine hundred and ten.

ANCEAL C. MICHAEL.

Witnesses:
ANTHONY DEAHL,
F. W. WOERNER.

Copies of this patent may be obtained for five cents each, by addressing the "Commissioner of Patents, Washington, D. C."